Patented May 11, 1954

2,678,337

UNITED STATES PATENT OFFICE 2,678,337

CATALYTIC ISOMERIZATION OF METHYL SUBSTITUTED PHENOLS

George M. Good, Albany, and George Holzman, Walnut Creek, Calif., assignors to Shell Development Company, Emeryville, Calif., a corporation of Delaware No Drawing. Application April 15, 1952, Serial No. 282,471

3 Claims. (Cl. 260—621)

This invention relates to the catalytic isomerization of methyl substituted phenols. It relates more particularly to the catalytic isomerization of cresols and xylenols and to the catalytic treatment, involving isomerization, of petroleum cresylic acids.

The methyl substituted phenols and especially the cresols and xylenols, find a wide variety of uses such, for instance, as in the production of oil insoluble resins, the production of oil soluble resins, the synthesis of antioxidants, disinfectants, wood preservatives, etc. It is well known that for these various uses certain of the isomers are much more suited than others. For example, in the production of certain types of resins, meta cresol is preferred to ortho or para cresol; for the production of certain antioxidants the para cresol and/or 2,4-xylenol is required; for other uses ortho cresol and 3,5-xylenol are desired. As a consequence of this, the prices of the individual isomers and mixtures of isomers fluctuate with the varied demands and vary considerably between the different products. For instance, at the present time ortho cresol is listed as selling at about 20¢/lb. whereas meta cresol is listed as selling at about 70¢/lb. It is, therefore, highly desirable to have a process available whereby a given isomer can be converted to another more desirable isomer in a practical manner.

This desired object can be attained by isomerization. While isomerization can be effected by hitherto known methods, these methods have shortcomings which render them impractical for commercial application. To the best of our knowledge no process for the isomerization of these products has ever been used commercially.

It is known, for example, that the various alkyl phenols can be isomerized by the use of Friedel-Crafts type catalysts such as aluminum chloride and its liquid complexes. This process is costly and is furthermore beset with numerous practical drawbacks. In order to overcome these difficulties, it has been suggested to effect the isomerization by vapor phase treatment of the alkyl phenol with aluminum fluoride or aluminum fluosilicate catalyst (see U. S. Patent No. 2,551,628). This would avoid many of the difficulties. However, the reaction rate is very slow. Very low space velocities are, therefore, required. The process would, therefore, require large and costly catalytic converters which would be, furthermore, difficult to maintain at a suitable reaction temperature. Tubular reactors which can be heated would be practically excluded and it would become necessary to attempt to supply the entire heat requirements by preheating the feed. Also, at the low space velocities required to obtain even a moderate conversion disproportionation into less desirable products is considerable. Also, at the long contact time under the severe conditions required to obtain even a moderate conversion, an appreciable amount of the feed is degraded into carbonaceous residues which deposit on the catalyst and render it ineffective in a short time.

As a typical example of the previously suggested process, ortho cresol was vaporized and preheated to about 500° C. and the vapors were passed at atmospheric pressure through a bed of pelleted aluminum fluoride at a liquid hourly space velocity of 0.23. Under these severe conditions about 19% of the ortho cresol was converted to side reaction products, including about 1.9% carbon (based on the feed) which deposited on the catalyst. Even under these severe conditions of high temperature and low space rate only a moderate total conversion (38%) of the ortho cresol was obtained and the cresol product, consisting of 75.4% ortho cresol, 15% meta cresol, and 9.1% para cresol, was far from the equilibrium concentration which, according to the best available evidence is approximately 35% ortho cresol, 45% meta cresol, and 20% para cresol. Thus, the approach to equilibrium using meta and para cresol as the key constituents was 33% and 45%, respectively, or an average of 39%.

It should also be noted that the above example is the most favorable for the process since the isomerization rate of ortho cresol to its isomers is approximately twice the rate of isomerization of meta cresol to its isomers (0.063 vs. 0.029). This will be apparent from the following measured isomerization rates:

| Conversion | Reaction Rate, $K_1$ |
|---|---|
| Ortho to meta | 0.053 \} 0.063 |
| Ortho to para | 0.010 |
| Meta to ortho | 0.016 \} 0.029 |
| Meta to para | 0.013 |

As a further typical example of the results obtainable by the hitherto suggested vapor phase process ortho cresol was treated under the same severe conditions using aluminum fluosilicate as catalyst. The results were even less favorable since the cresol products having the composition 78.8% ortho cresol, 15.2% meta cresol, and 6.0% para cresol was even further removed from the equilibrium mixture. Thus, again using the meta and para cresol as the key components the approach to equilibrium was 34% and 30%, respectively, or an average of 32%.

It has now been found that the desired isomerization of the methyl substituted phenols can be carried out in a practical vapor phase process at approximately twenty to fifty times the previous rate. This desired result is obtained by isomerizing the methyl substituted phenol in the vapor phase in the presence of hydrogen with a special catalyst. The catalyst which we have found effective for this process consists of alumina or bauxite which has been etched by treatment with an aqueous solution of ammonium fluoride or hydrofluoric acid. By treating the structurally isomerizable methyl substituted phenols in this manner under suitably chosen conditions a much better approach to the equilibrium compositions is attained even when operating at much higher space velocities. The process may therefore be carried out in small converters of approximately 1/20 to 1/50 of the size previously required. Also since the volume of catalyst is small the problem of conveying the necessary heat to the center of the catalyst mass is simplified. For example fired tubular reactors can be applied and excessive preheating of the feed avoided. Also since the space velocity is higher the tendency to crack or dealkylate the methyl phenols to lower boiling products is considerably decreased. Thus, as will be shown an even greater conversion (a closer approach to equilibrium) can be attained with less than half as much demethylation of cresol feed to phenol.

The process of the invention is suited for the isomerization of the isomerizable alkyl phenols (i. e., those containing at least one and less than five substituted alkyl groups) in which the alkyl groups are methyl groups, and more particularly for the isomerization of cresols, xylenols and petroleum cresylic acids. The methyl groups in these compounds are strongly held and are most difficult to shift. On the other hand the compounds are sufficiently stable to allow the isomerization to be carried out at relatively high temperature vapor phase conditions. The alkyl phenols containing ethyl groups, isopropyl groups, and particularly those containing tertiary alkyl groups, are relatively easily isomerized between the ortho and para states (but not the meta states) and can be isomerized even by traces of acid under low temperature conditions. On the other hand they are quite labile and undergo excessive degradation if it is attempted to isomerize them under vapor phase conditions. It is for this reason that the present process is limited to the isomerization of the methyl substituted phenols. The presence of some ethyl substituted phenols such as are often found as impurities in the commercial cresols, and xylenols and also in minor amounts in petroleum cresylic acids is, however, not excluded.

The isomerization is carried out in the vapor phase in the presence of added hydrogen. The amount of hydrogen to be applied is at least about 1 mole per mole of the methyl substituted phenol and may be any larger amount. Little if any, hydrogen is consumed in the reaction and therefore the hydrogen may be recovered and recycled in the process. Although the hydrogen is a diluent it is something more than a diluent since other diluents (nitrogen, for example) do not give equivalent results.

The alumina or bauxite used in preparing the catalyst is preferably an adsorptive variety having a fairly large available surface, e. g., about 100 or more square meters per gram, and having little if any, heavy metal impurities. Hydrogenation-dehydrogenation catalyst promoters such as nickel, platinum, cobalt and the like are particularly detrimental as they cause decomposition of the phenol with the formation of water. Prior to use the alumina or bauxite is treated with a dilute aqueous solution of ammonium fluoride or hydrogen fluoride for a short time. The resulting product may contain a little fluorine but the amount is less than 5% and generally from 0.5% to 2.5% depending upon the particular alumina and the treatment applied. It is therefore evident that the catalyst is essentially alumina and any aluminum fluoride which may be formed is quite small.

The catalyst may be in the form of granular fragments, pressed tablets, or a relatively fine powder.

High pressure is found to be detrimental. For this reason the isomerization is carried out at pressures below about 50 p. s. i. g. The temperature may range from about 425° C. up to about 525° C. The space velocity may be adjusted under the chosen conditions to afford the desired degree of conversion. In general it is not to best advantage to attempt to attain complete isomerization to equilibrium in one pass; it is, however, advantageous to attain a substantial degree of conversion, e. g., at least 50% approach to the equilibrium.

The process is preferably carried out by passing the vapors of the methyl substituted phenol and hydrogen through a bed of the catalyst maintained under the described conditions. As pointed out, the hydrogen may be separated from the condensed liquid product and recycled to the reaction zone with fresh feed. The liquid product may be used or sold as is, or it may be separated into more and less desired constituents and the less desired constituents can be retreated either alone or in admixture with fresh feed.

The process of the invention is particularly suited for the treatment of petroleum cresylic acids. Petroleum cresylic acids, although consisting largely of methyl substituted phenols, contain appreciable amounts of other materials. Also, the composition is quite different from the usual coal tar products in the matter of the relative concentration of the isomers. As a result of these differences the petroleum product is generally considered inferior and is sold at a lower price. When petroleum cresylic acids, and particularly the higher boiling fractions thereof, are treated by the described process, most of the higher alkyl phenols and non-phenolic materials are cracked into lower boiling products which can be removed from the remainder by simple fractionation. Also, the composition of the phenols approaches closely that usually found in the coal tar product.

Petroleum cresylic acids are generally produced as follows: Various acidic oils, e. g., pressure distillate, are extracted with caustic soda solution to remove all of the acidic constituents. The caustic extract is blown with air to convert most of the thiophenols to disulfides. The caustic extract is then extracted with an oily solvent, e. g., naphtha, to remove most of the disulfides. The caustic extract is then blown with flue gas whereby it is partially neutralized by the carbon dioxide. The so-called cresylic acids are liberated while most of the naphthenic acids are retained in solution. The liberated cresylic acids are separated and usually roughly distilled into relatively broad range fractions corresponding approximately in boiling range to phenol, cresols, xylenols, and higher boiling phenols.

Example I

Meta cresol of about 97% purity was mixed with 6 moles of hydrogen per mole of cresol and the mixture was preheated to approximately the reaction temperature. The preheated vaporous mixture was then passed through a heated reaction tube filled with 8-14 mesh granules of the catalyst and maintained at about 470° C. The pressure was substantially atmospheric. The catalyst was prepared by treating 8-14 mesh granules of an alumina having a surface area as measured by nitrogen adsorption of about 92 and a loss on ignition of about 4% with an aqueous 2.9% solution of hydrogen fluoride, and contained about 2% F. by analysis.

Under these conditions a 52% conversion of the cresol was effected with a contact time of as short as 0.27 second. Only 0.4% phenol was produced by demethylation and only 0.73% carbon was formed. The composition of the cresol products was as follows:

o-cresol 27%
m-cresol 59%
p-cresol 14%

Taking the ortho and para cresols (the produced isomers) as the key constituents and considering the above equilibrium composition it is seen that the approach to equilibrium was 77% and 70% respectively, or an average of 74%.

Example II

The importance of the hydrogen is illustrated by this comparable example in which nitrogen was substituted for the hydrogen, other conditions remaining the same.

Under these conditions the cresol was demethylated to give 4.4% of phenol; 1.17% of carbon was produced; and the composition of the cresol product was as follows:

o-cresol 24%
m-cresol 61%
p-cresol 15%

The corresponding approaches to equilibrium for the produced isomers (ortho and para cresols) were 69% and 75%, respectively, or an average of 72%.

We claim as our invention;

1. Process for the isomerization of methyl substituted phenols which comprises contacting a methyl substituted phenol in the vapor phase in the presence of at least an equimolar amount of added hydrogen with a hydrofluoric acid treated adsorptive alumina containing less than 5% fluorine at a pressure below about 50 pounds per square inch and at a temperature within the range of about 425° C. to about 525° C.

2. Process for the isomerization of petroleum cresylic acids which comprises contacting petroleum cresylic acids in the presence of at least an equimolar amount of added hydrogen with a hydrofluoric acid treated adsorptive alumina containing less than 5% fluorine at a pressure below about 50 pounds per square inch and a temperature within the range of about 425° C. to about 525° C.

3. Process for the isomerization of xylenols which comprises contacting a xylenol in the vapor phase in the presence of at least an equimolar amount of added hydrogen with a hydrofluoric acid treated adsorptive alumina containing less than 5% fluorine at a pressure below about 50 pounds per square inch and at a temperature within the range of about 425° C. to about 525° C.

References Cited in the file of this patent

UNITED STATES PATENTS

| Number | Name | Date |
|---|---|---|
| 2,295,674 | Meharg et al. | Sept. 15, 1942 |
| 2,336,165 | Connolly | Dec. 7, 1943 |
| 2,551,628 | Nickels | May 8, 1951 |